(12) United States Patent
Yamada et al.

(10) Patent No.: US 6,967,049 B1
(45) Date of Patent: Nov. 22, 2005

(54) OPTICAL RECORDING MEDIUM

(75) Inventors: Takashi Yamada, Tokyo (JP); Tsuyoshi Komaki, Tokyo (JP); Tomoki Ushida, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/857,169

(22) Filed: May 28, 2004

(51) Int. Cl.$^7$ .................................................. B32B 3/02

(52) U.S. Cl. .................... 428/64.1; 428/64.4; 428/64.5; 428/64.6; 430/270.13

(58) Field of Search .................... 428/64.5; 430/270.13

(56) References Cited

U.S. PATENT DOCUMENTS

| | | | |
|---|---|---|---|
| 5,298,305 A * | 3/1994 | Shinozuka et al. | 428/64.6 |
| 6,083,597 A * | 7/2000 | Kondo | 428/64.1 |
| 6,128,274 A * | 10/2000 | Mori et al. | 369/275.5 |
| 6,596,367 B2 * | 7/2003 | Van Der Tempel | 428/64.1 |
| 6,636,476 B1 * | 10/2003 | Arakawa et al. | 369/283 |
| 2002/0081525 A1 * | 6/2002 | Takamori et al. | 430/273.1 |

FOREIGN PATENT DOCUMENTS

JP  04-195745  7/1992

* cited by examiner

Primary Examiner—Elizabeth Mulvaeny
(74) Attorney, Agent, or Firm—Seed IP Law Group PLLC

(57) ABSTRACT

An optical recording medium includes a support substrate, a first resin layer and a second resin layer formed on opposite surface sides of the support substrate, an information recording layer formed between the first resin layer and the support substrate and containing a recording film, and a moisture-proof layer formed between the second resin layer and the support substrate and the moisture-proof layer contains at least one element among elements contained in the recording film.

According to the present invention, since the first resin layer is formed on the moisture-proof layer containing at least one element among elements contained in the recording film, on the information recording layer and the second resin layer is formed on the moisture-proof layer, it is possible to form the first resin layer and the second resin layer having substantially the same physical properties on the opposite sides of the support substrate and it is therefore possible to suppress the warpage of the optical recording medium due to heat and moisture to the minimum.

8 Claims, 2 Drawing Sheets

A

OPTICAL RECORDING MEDIUM

BACKGROUND OF THE INVENTION

The present invention relates to an optical recording medium and, particularly, to an optical recording medium which can be prevented from warping as desired.

DESCRIPTION OF THE PRIOR ART

Optical recording media such as the CD, DVD and the like have been widely used as recording media for recording digital data. These optical recording media can be roughly classified into write-once type optical recording media such as the CD-R and DVD-R that enable writing but not rewriting of data, and data rewritable type optical recording media such as the CD-RW and DVD-RW that enable rewriting of data.

When data are to be reproduced from an optical recording medium, a laser beam whose power is set to a reproducing power is first projected onto the optical recording medium. Since a region where a recording mark is formed in the optical recording medium has different reflectivity with respect to the laser beam from those of other regions, the amount of the laser beam reflected from the optical recording medium varies dependent upon the presence or absence of a recording mark. Therefore, it is possible to generate a reproduced signal and reproduce data by detecting the amount of the laser beam reflected from the optical recording medium and converting it to an electrical signal using a light detector.

Accordingly, it is necessary for reading data recorded in an optical recording medium in a desired manner to reliably make a laser beam reflected from an optical recording medium enter a light receiving surface of a light detector.

However, in the case where an optical recording medium is greatly warped due to heat or moisture applied thereto during use, since the incident angle of the laser beam entering the optical recording medium greatly varies, it is difficult to reliably make the laser beam reflected from the optical recording medium enter the light detector.

Therefore, in order to reproduce data recorded in the optical recording medium in a desired manner it is required to reduce the warpage of the optical recording medium, and Japanese Patent Application Laid Open No. 4-195745 discloses an optical recording medium in which the warpage thereof is suppressed by forming a layer for preventing the warpage thereof on the reverse surface thereof.

The optical recording medium disclosed in Japanese Patent Application Laid Open No. 4-195745 includes a first dielectric layer formed on an obverse surface of a substrate and a second dielectric layer formed on a reverse surface of the substrate and having substantially the same thermal expansion coefficient as that of the first dielectric layer. In the thus constituted optical recording medium, stress and bending moment generated in the first dielectric layer due to heat or moisture applied to the optical recording medium during use are canceled by stress and bending moment generated in the second dielectric layer, thereby preventing the optical recording medium from warping.

On the other hand, a next-generation type optical recording medium that offers improved recording density and has an extremely high data transfer rate has been recently proposed. In such a next-generation type optical recording medium, recording density is to be increased by increasing the numerical aperture NA of an objective lens for condensing the laser beam and shortening the wavelength λ of the laser beam.

However, if the numerical aperture NA of the objective lens for condensing the laser beam is increased, then, as shown by Equation (1), the permitted tilt error of the optical axis of the laser beam to the optical recording medium, namely, the tilt margin T, has to be greatly decreased.

$$T \propto \frac{\lambda}{d \cdot NA^3} \quad (1)$$

In Equation (1), d is the distance from a light incidence plane to the surface of an information recording layer in which data are to be recorded, namely, the thickness of a layer(s) through which a laser beam passes until it reaches the information recording layer. As apparent from Equation (1), the tilt margin T decreases as the numerical aperture NA of the objective lens increases and increases as the thickness d of the layer(s) through which the laser beam passes decreases.

Therefore, in a next-generation type optical recording medium, the tilt margin T is to be increased by forming a thin resin layer having a thickness of about 100 μm on an information recording layer and projecting a laser beam from the side of the resin layer onto the optical recording medium, thereby recording data therein and reproducing data therefrom.

Accordingly, the next-generation type optical recording medium is constituted by sequentially laminating an information recording layer and a resin layer on a support substrate having a thickness of about 1.1 mm and has an asymmetrical structure unlike a DVD type optical recording medium constituted by laminating disk-like substrates each having a thickness of about 0.6 mm via an information recording layer and having a symmetrical structure.

Therefore, since the thicknesses of the support substrate and the resin layer are different from each other in the next-generation type optical recording medium, the optical recording medium tends to warp due to heat or moisture applied thereto and, particularly in the case where the support substrate and the resin layer are formed of different materials, since rigidity, linear thermal expansion coefficients, Young's modulus, internal stresses or the like are different between the material forming the support substrate and the material for forming the resin layer, the optical recording medium much more tends to warp.

Thus, since the next-generation type optical recording medium particularly tends to warp, it has also been tried in the next-generation type optical recording medium to suppress the warpage thereof by forming on a reverse surface side of a support substrate a resin layer having substantially the same physical properties as that of a resin layer formed on an obverse surface side of the support substrate and canceling out stresses to be applied to the obverse surface and the reverse surface of the support substrate.

Therefore, even in the case where resin layers are formed on both the obverse and reverse surface sides of the support substrate of the same material, it is actually impossible to form the resin layers having the same physical properties and it is difficult to suppress the warpage of the optical recording medium in a desired manner.

Further, although it is required to develop a next-generation type optical recording medium for business use, as well as that for private use, since a smaller amount of warpage is allowed in and severe conditions are imposed on the optical recording medium for business use in comparison with those in the optical recording medium for private use, it is necessary to much reduce the warpage of the optical recording medium.

SUMMARY OF THE INVENTION

It is therefore an object of the present invention to provide an optical recording medium which can be prevented from warping as desired.

The inventors of the present invention vigorously pursued a study for accomplishing the above object and, as a result, reached the conclusion that even in the case where resin layers are formed on obverse and reverse surface sides of a support substrate of ultraviolet ray curable resins having substantially the same physical properties, the resin layer formed on the obverse surface side of the support substrate and the resin layer formed on the reverse side surface of the support substrate do not have the same physical properties and this is because the ultraviolet ray curable resins are influenced by layers serving a base during the curing process of the ultraviolet ray curable resins and some change in property of the ultraviolet ray curable resins occurs.

Therefore, through much and various trial and error, the inventors of the present invention made the discovery that in the case of forming a moisture-proof layer containing at least one element among elements contained in a recording film included in an information recording layer on a reverse surface side of a support substrate, forming one resin layer on the information recording layer and forming another resin layer on the moisture-proof layer, it was possible to form the resin layers to have substantially the same physical properties.

The present invention is based on these finings and the above object of the present invention can be accomplished by an optical recording medium including a support substrate, a first resin layer and a second resin layer formed on opposite surface sides of the support substrate, an information recording layer formed between the first resin layer and the support substrate and containing a recording film, and a moisture-proof layer formed between the second resin layer and the support substrate, the moisture-proof layer containing at least one element among elements contained in the recording film.

According to the present invention, since it is possible to prevent physical properties of the first resin layer as a resin layer formed on the obverse surface side of the support substrate and those of the second resin layer as a resin layer formed on the reverse surface side of the support substrate from differing greatly, stresses applied to the obverse and reverse surfaces of the support substrate can be canceled. Therefore, it is possible to prevent the optical recording medium from warping due to heat or moisture applied thereto in a desired manner.

In the present invention, the recording film preferably contains Sb and Te and the moisture-proof layer preferably contains at least one of Sb and Te.

In the present invention, the moisture-proof layer preferably contains as a primary component the same element as that contained in the recording film as a primary component.

In the present invention, it is more preferable for the recording film to contain a phase change material as a primary component and for the moisture-proof layer to contain as a primary component the same phase change material as that contained in the recording film as a primary component.

In the present invention, a moisture-proof layer is preferably formed so as to have a thickness of 20 to 300 nm and more preferably formed so as to have a thickness of 30 to 200 nm. In the case where a moisture-proof layer is thinner than 20 nm, it is difficult to obtain a moisture-proof layer having a sufficient moisture-proof characteristic and, on the other hand, in the case where a moisture-proof layer is thicker than 300 nm, it takes a longer time for forming the moisture-proof layer, thereby lowering the productivity of the optical recording medium.

The above and other objects and features of the present invention will become apparent from the following description made with reference to the accompanying drawings.

DESCRIPTION OF THE PREFERRED EMBODIMENTS

Figure 1:
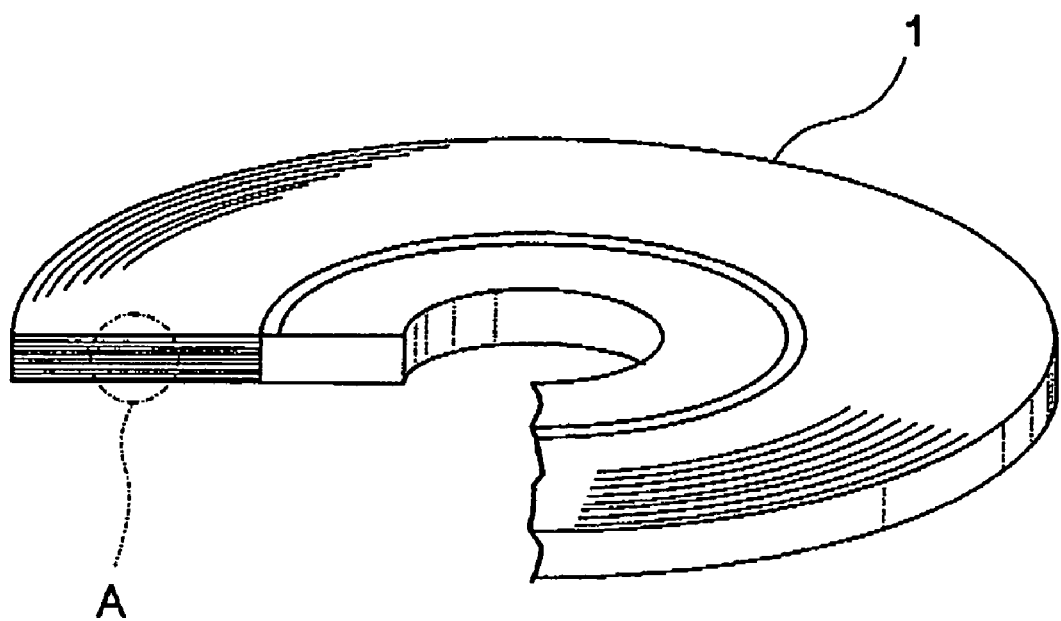
FIG. 1 is a schematic perspective view showing an optical recording medium that is a preferred embodiment of the present invention.
Figure 2:
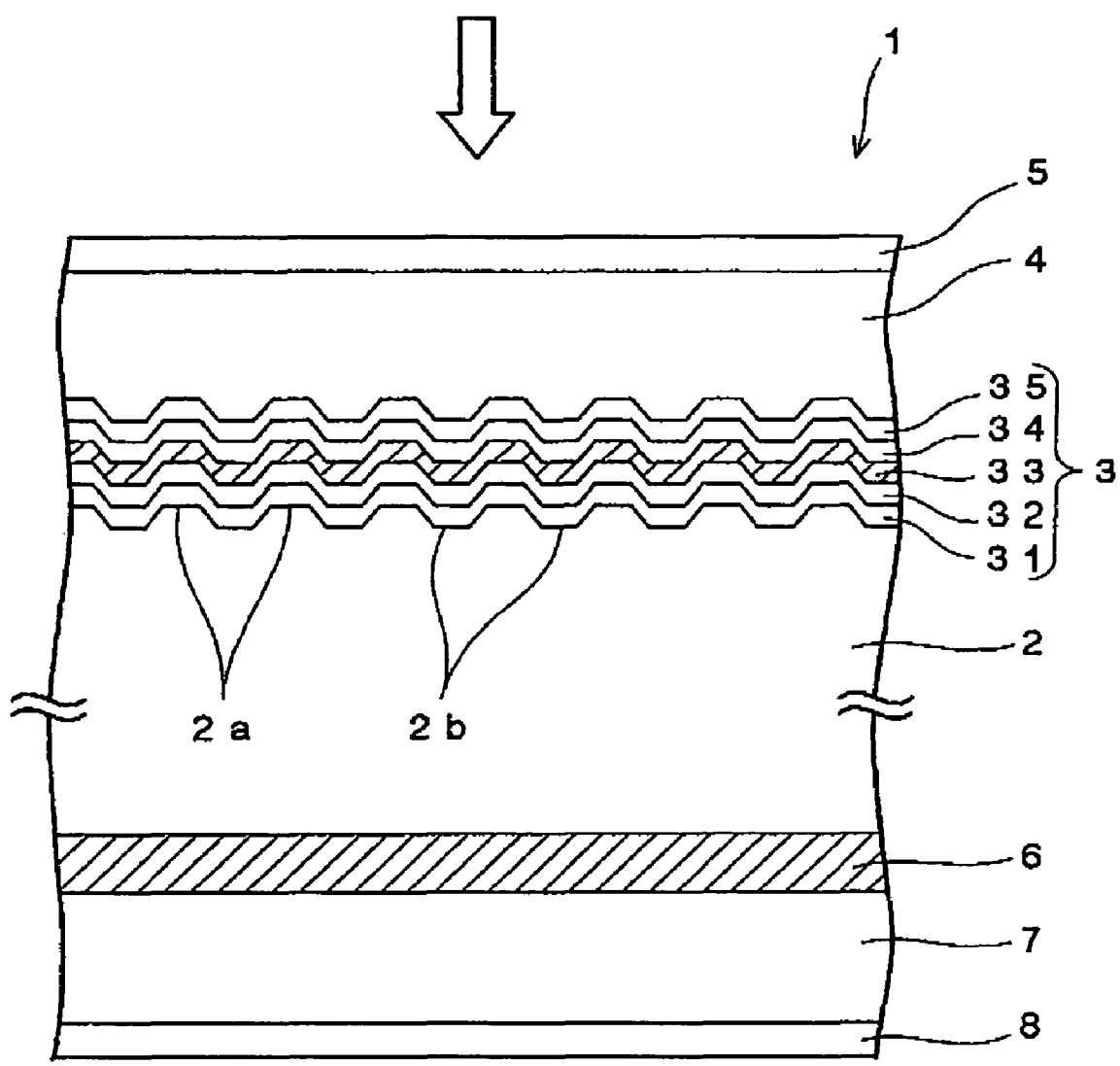
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is a schematic enlarged cross-sectional view indicated by A in FIG. 1.

As shown in FIG. 1, an optical recording medium 1 according to this embodiment is formed disk-like and is formed with a center hole at the center portion thereof for setting the optical recording medium 1 to a data recording and reproducing apparatus.

The optical recording medium 1 shown in FIGS. 1 and 2 is so constituted that a laser beam having a wavelength $\lambda$ of 380 nm to 450 nm is projected via an objective lens (not shown) having a numerical aperture NA which satisfies that $\lambda/NA$ is equal to or smaller than 640 nm in a direction indicated by an arrow in FIG. 2, whereby data are recorded therein or data are reproduced therefrom.

As shown in FIG. 2, the optical recording medium 1 includes a support substrate 2, an information recording layer 3 formed on one surface of the support substrate 2, a first resin layer 4 formed on the information recording layer 3, a first hard coat layer 5 formed on the first resin layer 4, a moisture-proof layer 6 formed on the other surface of the support substrate 2, a second resin layer 7 formed on the moisture-proof layer 6, and a second hard coat layer 8 formed on the second resin layer 7.

The support substrate 2 serves as a support of the optical recording medium 1.

The material used to form the support substrate 2 is not particularly limited insofar as the support substrate 2 can serve as the support of the optical recording medium 1 and the support substrate 2 can be formed of polycarbonate resin or polyolefin resin, for example. The thickness of the support substrate 2 is not particularly limited and the support substrate 2 preferably has a thickness of about 1.1 mm.

Grooves 2a and lands 2b for guiding the laser beam are spirally formed on one surface of the support substrate 2 from a portion in the vicinity of the center thereof toward an outer periphery thereof or from an outer periphery thereof toward a portion in the vicinity of the center thereof.

Although not particularly limited, the depth of the groove 2a is preferably set to 10 nm to 40 nm and the pitch of the grooves 2a is preferably set to 0.2 μm to 0.4 μm.

As shown in shown in FIG. 2, the information recording layer 3 includes a reflective film 31 formed on the support substrate 2, a second dielectric film 32 formed on the reflective film 31, a recording film 33 formed on the second dielectric film 32, a first dielectric film 34 formed on the recording film 33, and a heat radiation film 35 formed on the first dielectric film 34.

The reflective film 31 serves to reflect the laser beam entering through the first resin layer 4 so as to emit it through the first resin layer 4 and serves to increase a C/N ratio of a reproduced signal by a multiple interference effect.

The material for forming the reflective film 31 is not particularly limited insofar as it can reflect the laser beam and the reflective film 31 can be formed of Mg, Al, Ti, Cr, Fe, Co, Ni, Cu, Zn, Ge, Ag, Pt, Au, Nd, In, Sn or the like. Among these materials, it is preferable to form the reflective layer 31 of a metal material having a high reflectivity, such as Al, Au, Ag, Cu or alloy containing at least one of these metals, such as alloy of Ag and Cu.

The thickness of the reflective film 31 is not particularly limited and the reflective film 31 is preferably formed so as to have a thickness of 10 nm to 300 nm and more preferably formed so as to have a thickness of 20 nm to 200 nm.

The first dielectric film 34 and the second dielectric film 33 serve to physically and chemically protect the recording film 33 and to adjust optical characteristics of the optical recording medium 1 so that the difference in the reflectivity between a portion where a recording mark described later is formed and other portions of the recording film 33 is increased by a multiple interference effect when data recorded in the recording film 33 are reproduced, whereby a reproduced signal having a high C/N ratio can be obtained.

The material for forming the first dielectric layer 34 and the second dielectric layer 32 is not particularly limited and it is preferable to form the first dielectric layer 34 and the second dielectric layer 32 of oxide, nitride, sulfide or fluoride containing at least one metal selected from a group consisting of Si, Zn, Al, Ta, Ti, Co, Zr, Pb, Ag, Sn, Ca, Ce, V, Cu, Fe, and Mg, or a combination thereof.

The first dielectric layer 34 preferably has a thickness of 10 nm to 50 nm and more preferably has a thickness of 20 nm to 30 nm. In the case where the first dielectric layer 34 is thinner than 10 nm, it is difficult for the first dielectric layer 34 to serve to protect the recording film 33 and improve optical characteristics of the optical recording medium 1. On the other hand, in the case where the first dielectric layer 34 is thicker than 50 nm, it take a longer time for forming the first dielectric layer 34, thereby lowering the productivity of the optical recording medium 1.

Further, the second dielectric layer 32 preferably has a thickness of 5 nm to 20 nm and more preferably has a thickness of 10 nm to 15 nm. In the case where the second dielectric layer 32 is thinner than 5 nm, it is difficult for the second dielectric layer 32 to serve to protect the recording film 33 and on the other hand, in the case where the second dielectric layer 32 is thicker than 20 nm, it take a longer time for forming the second dielectric layer 32, thereby lowering the productivity of the optical recording medium 1.

The recording film 33 is a layer in which data are to be recorded. In this embodiment, the recording film 33 is formed of a phase change material and data are recorded in the recording film 33 and data are reproduced from the recording film 33 utilizing the difference in reflectivity between when the phase change material is in a crystalline phase and when it is in an amorphous phase.

When data are to be recorded in the recording film 33, a laser beam whose power is modulated between a recording power Pw and a bottom power Pb is projected onto the recording film 33 and a region of the recording film 33 irradiated with the laser beam is heated to a temperature equal to or higher than the melting point of the phase change material. The power of the laser beam is then set to the bottom power Pb, thereby quickly cooling the region of the recording film 33 irradiated with the laser beam and the phase change material is changed to an amorphous state, thereby forming a recording mark.

On the other hand, when data recorded in the recording film 33 is to be erased, a laser beam whose power is modulated between the recording power Pw, the bottom power Pb and an erasing power Pe is projected onto the recording film 33, thereby heating a region of the recording film 33 irradiated with the laser beam to temperature equal to or higher than the crystallization temperature of the phase change material and the phase change material is crystallized, thereby erasing a recording mark. Since the phase change reactions of the phase change material contained in the recording film 33 from an amorphous phase to a crystalline phase and from the crystalline phase to the amorphous phase are reversible, data recorded in the recording film 33 can be repeatedly rewritten.

The phase change material for forming the recording film 33 is not particularly limited but a material capable of changing from an amorphous phase to a crystal phase in a short time is preferable in order to rewrite data recorded in the recording film 33 at a high velocity. Illustrative examples of materials having such a characteristic include a SbTe system material. As the SbTe system material, SbTe may be used alone or a SbTe system material to which additives are added in order to shorten time required for crystallization and improve the long-term storage reliability of the optical recording medium 10 may be used.

Concretely, it is preferable to form the recording film 33 of a SbTe system material represented by the compositional formula: $(Sb_xTe_{+x})_{+y}M_y$, where x is equal to or larger than 0.55 and equal to or smaller than 0.9 and y is equal to or larger than 0 and equal to or smaller than 0.25, and it is more preferable to form the recording film 33 of a SbTe system material represented by the above mentioned compositional formula wherein x is equal to or larger than 0.65 and equal to or smaller than 0.85 and y is equal to or larger than 0 and equal to or smaller than 0.25.

M is an element other than Sb and Te and while M is not particularly limited, it is preferable for the element M to be one or more elements selected from the group consisting of In, Ag, Au, Bi, Se, Al, P, Ge, H, Si, C, V, W, Ta, Zn, Mn, Ti, Sn, Pd, Pb, N, O and rare earth elements in order to shorten time required for crystallization and improve the storage reliability of the optical recording medium 1.

It is preferable to form the recording film 33 so as to have a thickness of 2 nm to 40 nm, is more preferable to form it so as to have a thickness of 4 nm to 30 nm and is further preferable to form it so as to have a thickness of 5 nm to 20 nm. In the case where the recording film 33 is thinner than 2 nm, the difference in optical characteristics between before and after recording data becomes small and a signal having a high C/N ratio cannot be obtained when data are reproduced. On the other hand, in the case where the recording film 33 is thicker than 40 nm, the amount of heat required for forming a recording mark becomes great and there is risk of recording sensitivity declining.

The heat radiation film 35 serves to quickly radiate heat generated in the recording film 33 toward a light incidence plane.

The material for forming the heat radiation film 35 is not particularly limited insofar as it can quickly radiate heat generated in the recording film 33 but it is preferable to use a material having a thermal conductivity higher than that of the first dielectric film 34 for forming the heat radiation film 35. Illustrative examples of materials having such a characteristic include oxide, nitride, sulfide or fluoride containing at least one metal selected from a group consisting of Al, Si, Ce, Ti, Zn, Ta, or a combination thereof.

It is preferable for the heat radiation film 35 to have a thickness of 15 nm to 40 nm. In the case where the heat radiation film 35 is thinner than 15 nm, sufficient heat radiation characteristics cannot be obtained and, on the other hand, in the case where the heat radiation film 35 is thicker than 40 nm, it takes much time to form the heat radiation film 35, thereby lowering the productivity of the optical recording medium 1.

The first resin layer 4 serves to transmit the laser beam and serves as a protecting layer for the surface of the information recording layer 3.

It is required for the first resin layer 4 to be optically transparent and have small absorption, reflection and birefringence with respect to light within the same wavelength region as that of the laser beam having a wavelength of 390 to 420 nm, and the first resin layer 4 is formed of ultraviolet ray curable resin, for example.

The ultraviolet ray curable resin used for forming the first resin layer 4 contains a photo-polymerizable monomer, a photo-polymerizable oligomer, a photoinitiator and other additives as occasion demands. As a photo-polymerizable monomer, one of a molecular weight of less than 2,000 is preferable, and illustrative examples of such monomers include a monofunctional acrylate (methacrylate) and a multifunctional acrylate (methacrylate). Illustrative examples of photo-polymerizable oligomers include an oligomer containing or introduced with, in a molecule, a functional group such as an acrylic double bond, an allylic double bond, an unsaturated double bond or the like, each of which is bridgeable or polymerizable by irradiation with an ultraviolet ray. As a photoinitiator, conventional photoinitiators can be employed and for example, a molecular cleavage type photo-polymerization initiator may be employed.

It is preferable for the first resin layer 4 to have a thickness of 30 µm and 200 µm.

The first hard coat layer 5 serves to physically protect the first resin layer 4 and to prevent the first resin layer 4 from being damaged.

The material for forming the first hard coat layer 5 is not particularly limited but it is preferable to form the first hard coat layer 5 of a material having high transparency and abrasion resistance. Concretely, it is preferable to form the first hard coat layer 5 of a hard coat composition prepared by adding inorganic fine particles having an average diameter equal to or smaller than 100 nm to ultraviolet ray curable resin.

It is preferable to form the first resin layer 4 so as to have a thickness of 1 µm to 10 µm and is more preferable to form it so as to have a thickness of 1 µm to 5 µm. In the case where the first resin layer 4 is thinner than 1 µm, it is difficult to form the first resin layer 4 having necessary hardness and abrasion resistance, and on the other hand, in the case where the first resin layer 4 is thicker than 10 µm, there arises a risk of generating cracks in the first resin layer 4 due to internal stress.

As shown in FIG. 2, the moisture-proof layer 6, the second resin layer 7 and the second hard coat layer 8 are formed on the other surface of the support substrate 2.

The moisture-proof layer 6 serves to prevent water from entering the support substrate 2 through the second resin layer 7.

In this embodiment, the moisture-proof layer 6 contains at least one element among elements contained in the recording film 33.

It is preferable for the moisture-proof layer 6 to contain one of the elements among Sb and Te contained in the recording film 33 and is more preferable for it to contain as a primary component the same phase change material as that contained in the recording film 33 as a primary component.

It is preferable to form the moisture-proof layer 6 so as to have a thickness of 20 nm to 300 nm and is more preferable to form it so as to have a thickness of 30 nm to 200 nm. In the case where the moisture-proof layer 6 is thinner than 20 nm, it is difficult to form a moisture-proof layer 6 having sufficient moisture-proof characteristics and on the other hand, in the case where the moisture-proof layer 6 is thicker than 300 nm, it takes much time to form the moisture-proof layer 6, thereby lowering the productivity of the optical recording medium 1.

The second resin layer 7 serves to cancel stress and bending moment generated in the first resin layer 4 with stress and bending moment generated therein, thereby preventing the optical recording medium 1 from warping.

It is preferable for the second resin layer 7 to have the same physical properties such as rigidity, linear thermal expansion coefficient, Young's modulus, internal stress and the like as those of the first resin layer 4 and it is therefore preferable to form the second resin layer 7 of the same ultraviolet ray curable resin as that used for forming the first resin layer 7. However, it is sufficient for the ultraviolet ray curable resin used for forming the second resin layer 7 to have substantially the same physical properties after curing but it is not absolutely necessary to form the second resin layer 7 of the same ultraviolet ray curable resin as that used for forming the first resin layer 7.

In this specification, ultraviolet ray curable resin having substantially the same physical properties after curing as those of the first resin layer 4 means ultraviolet ray curable resin in which among the physical properties such as rigidity, linear thermal expansion coefficient, Young's modulus, internal stress and the like, at least Young's modulus and the linear thermal expansion coefficient differ from those of the first resin layer by 5% or less.

Similarly to the first resin layer 4, it is preferable for the second resin layer 7 to have a thickness of 30 µm to 200 µm. However, it is not absolutely necessary for the second resin layer 7 to have the same thickness as that of the first resin layer 4 and the second resin layer 7 may have a different thickness from the first resin layer 4 insofar as the physical properties of the second resin layer 7 are not greatly different from those of the first resin layer 4.

The second hard coat layer 8 serves to cancel stress generated in the first hard coat layer 5 with that generated therein.

It is preferable for the second hard coat layer 8 to have the same physical properties as those of the first hard coat layer 5 and it is therefore preferable to form the second hard coat layer 8 of the same hard coat composition as that used for the first hard coat layer 5.

Similarly to the first hard coat layer 5, it is preferable to form the second hard coat layer 8 so as to have a thickness of 1 μm to 10 μm and is more preferable to form it so as to have a thickness of 1 μm to 5 μm.

The optical recording medium 1 having the above-described configuration can be fabricated in the following manner.

The support substrate 2 having the groove 2a and the land 2b on one surface thereof is first fabricated by injection molding using a stamper.

Then, the reflective film 31, the second dielectric film 32, the recording film 33, the first dielectric film 34 and the heat radiation film 35 are sequentially formed by a gas phase growth process such as sputtering process on the substantially entire surface of the support substrate 2 on which the groove 2a and the lands 2b are formed, whereby the information recording layer 3 is formed.

Further, ultraviolet ray curable resin is applied by a spin coating method onto the information recording layer 3 to form a coating layer and an ultraviolet ray is projected onto the coating layer, whereby the ultraviolet ray curable resin is cured and the first resin layer 4 is formed.

Then, a hard coat composition containing ultraviolet ray curable resin and inorganic fine particles is applied by a spin coating method onto the first resin layer 4 to form a coating layer and an ultraviolet ray is projected onto the coating layer, whereby the ultraviolet ray curable resin is cured and the first hard coat layer 5 is formed.

Further, the support substrate 2 is set in a sputtering apparatus in such a manner that the surface thereof on which no grooves 2a and lands 2b are formed is directed upward and the moisture-proof layer 6 is formed on the surface of the support substrate 2 by a gas phase growth process such as sputtering process using a target containing at least one element among elements contained in the recording film 33.

Then, ultraviolet ray curable resin whose physical properties after curing are the same as those of the first resin layer 4 is applied by a spin coating method onto the moisture-proof layer 6 to form a coating layer and an ultraviolet ray is projected onto the coating layer, whereby the ultraviolet ray curable resin is cured and the second resin layer 7 is formed.

In a study done by the inventors of the present invention, it was found that in the case where a moisture-proof layer 6 serving as a base layer when a second resin layer 7 was formed contained at least one element among elements contained in a recording film 33, when a first resin layer 4 was formed on the information recording layer 3 and a second resin layer 7 was formed on the moisture-proof layer 6, it was possible to prevent the physical properties of the first resin layer 4 and those of the second resin layer 7 from differing greatly. Therefore, it is possible to form the first resin layer 4 and the second resin layer 7 having substantially the same physical properties on the opposite surfaces of the support substrate 2.

Finally, a hard coat composition whose physical properties after curing are the same as those of the first hard coat layer 5 is applied by a spin coating method onto the second resin layer 7 to form a coating layer and an ultraviolet ray is projected onto the coating layer, whereby the ultraviolet ray curable resin is cured and the second hard coat layer 8 is formed.

Thus, the optical recording medium 1 is completed.

According to this embodiment, since it is possible to form the first resin layer 4 and the second resin layer 7 to have substantially the same physical properties on the opposite surfaces of the support substrate 2, it is possible to suppress the warpage of the optical recording medium 1 to the minimum.

Hereinafter, working examples will be set out in order to further clarify the advantages of the present invention.

WORKING EXAMPLES AND COMPARATIVE EXAMPLES

A sample # 1 was fabricated in the following manner.

A disk-like polycarbonate substrate having a thickness of 1.1 mm and a diameter of 120 mm was first fabricated by an injection molding process.

Then, a reflective film containing Ag as a primary component and having a thickness of 100 nm, a second dielectric film containing a mixture of ZnS and $SiO_2$ and having a thickness of 10 nm, a recording film containing an alloy Sb—Te—Ge as a primary component and having a thickness of 10 nm, a first dielectric film containing a mixture of ZnS and $SiO_2$ and having a thickness of 20 nm and a heat radiation film containing AlN as a primary component and having a thickness of 30 nm were sequentially formed on one surface of the polycarbonate substrate using the sputtering process, thereby forming an information recording layer.

Further, the polycarbonate substrate formed with the information recording layer was set on a spin coating apparatus and the information recording layer was coated using the spin coating method with ultraviolet ray curable resin having the composition identified below to form a coating layer. Then, an ultraviolet ray was projected onto the coating layer so that a total amount thereof was 3000 $mJ/cm^2$, whereby the ultraviolet ray curable resin was cured and a first resin layer having a thickness of 100 μm was formed.

Urethane acrylate (Negami Chemical Industrial Co., Ltd; Product Name "ART RESIN UN-5200") 50 weight %

Trimethylolpropane triacrylate (NIPPON KAYAKU CO., LTD.; Product Name "KAYARAD TMPTA") 33 weight %

Phenoxyhydroxypropyl acrylate (NIPPON KAYAKU CO., LTD.; Product Name "KAYARAD R-128") 14 weight %

1-hydroxycyclohexyl phenyl ketone (CIBA-GUIGY CO., LTD.; Product Name "IRG184") 3 weight %

Then, the polycarbonate substrate formed with the first resin layer was reversed and a moisture-proof layer containing an alloy Sb—Te—Ge and as a primary component and having a thickness of 100 nm was formed on the other surface of the polycarbonate substrate by the sputtering process.

Finally, the same ultraviolet ray curable resin as that used for forming the first resin layer was applied by the spin coating method onto the moisture-proof layer to form a coating layer. Then, an ultraviolet ray was projected onto the coating layer so that a total amount thereof was 3000 $mJ/cm^2$, whereby the ultraviolet ray curable resin was cured and a second resin layer having a thickness of 100 μm was formed. Thus, the sample #1 was fabricated.

Further, a sample #2 was fabricated in the manner of fabricating the sample #1 except that a moisture-proof layer containing Ag as a primary component was formed.

Then, each of the sample #1 and the sample #2 was held at a temperature of 25° C. and relative humidity of 95% until the water content therein was saturated and the temperature thereof became 25° C. Thereafter, each of them was set in a high-accuracy laser warpage angle measuring machine manufactured and sold by KEYENCE CORPORATION "LA-2000" (Product Name) and the warpage angle $\beta_1$ at a position spaced by 58 mm from the center thereof was measured.

Further, each of the sample #1 and the sample #2 was set in the above mentioned high-accuracy laser warpage angle measuring machine at a temperature of 25° C. and relative humidity of 10% and the warpage angle $\beta_2$ at a position spaced by 58 mm from the center thereof was measured. When the warpage angle $\beta_2$ of each sample was determined, warpage angles were successively measured at a temperature of 25° C. and relative humidity of 10% until the warpage angle did not vary and the maximum value thereof was determined as the warpage angle $\beta_2$ thereof.

Here, each of the warpage angles $\beta_1$ and $\beta_2$ was defined to be plus when each sample warped toward the first resin layer and minus when it warped toward the second resin layer.

Then, the difference ($\beta_1 - \beta_2$) between the warpage angles $\beta_1$ and $\beta_2$ for each sample was caculated and the degree of warpage of each sample was rated. The degree of warpage was rated to be "GOOD" when the difference ($\beta_1 - \beta_2$) in the warpage angles was equal to or smaller than 0.35 degrees and "BAD" when it was larger than 0.35 degrees. The results of the measurement are shown in Table 1.

TABLE 1

| | warpage angle $\beta_1$ (deg) | warpage angle $\beta_2$ (deg) | difference in warpage angles (deg) | rating |
|---|---|---|---|---|
| sample #1 | 0.05 | −0.25 | 0.30 | GOOD |
| sample #2 | 0.02 | −0.73 | 0.75 | BAD |

As shown in Table 1, it was found that in the sample #1, the difference in the warpage angles thereof was 0.30 degrees and smaller than 0.35 degrees and that the warpage of the optical recording medium could be prevented. To the contrary, in the sample #2, the difference in the warpage angles thereof was 0.75 degrees and could not suppressed to be equal to or smaller than 0.35 degrees.

The present invention has thus been shown and described with reference to a specific embodiment and working example. However, it should be noted that the present invention is in no way limited to the details of the described arrangements but changes and modifications may be made without departing from the scope of the appended claims.

For example, in the optical recording medium 1 shown in FIGS. 1 and 2, although the first hard coat layer 5 is formed on one side of the support substrate 2 and the second hard coat layer 8 is formed on the other side of the support substrate 2, it is not absolutely necessary to form two hard coat layers and one or both of the first hard coat layer 5 and the second hard coat layer 8 may be omitted.

Further, in the above described embodiment, although the first dielectric film 34 and the second dielectric film 32 are formed on the opposite sides of the recording film 33, it is not absolutely necessary to form the first dielectric film 34 and the second dielectric film 32 on the opposite sides of the recording film 33 and the first dielectric film 34 may be omitted in the case where the difference in reflectivity between a region of the recording film 33 where a recording mark is formed and regions where no recording mark is formed is large.

Furthermore, in the above described embodiment, although the heat radiation film 35 is provided, it is not absolutely necessary to provide the heat radiation film 35 and the heat radiation film 35 may be omitted in the case where heat generated in the recording film 33 can be quickly radiated by a dielectric film formed in the vicinity of the recording film 3 or the recording film 33 itself.

Moreover, in the above described embodiment, although the reflective film 31 is provided, it is not absolutely necessary to provide the reflective film 31 and the reflective film 31 may be omitted in the case where the difference in reflectivity between a region of the recording film 33 where a recording mark is formed and regions where no recording mark is formed is large.

According to the present invention, it is possible to provide an optical recording medium which can be prevented from warping in a desired manner.

What is claimed is:

1. An optical recording medium comprising a support substrate, a first resin layer and a second resin layer formed on opposite surface sides of the support substrate, an information recording layer formed between the first resin layer and the support substrate and containing a recording film, and a moisture-proof layer formed between the second resin layer and the support substrate, the moisture-proof layer containing at least one element among elements contained in the recording film.

2. An optical recording medium in accordance with claim 1, wherein the recording film contains Sb and Te and the moisture-proof layer contains at least one of Sb and Te.

3. An optical recording medium in accordance with claim 1, wherein the moisture-proof layer contains as a primary component the same element as that contained in the recording film as a primary component.

4. An optical recording medium in accordance with claim 3, wherein the recording film contains a phase change material as a primary component and the moisture-proof layer contains as a primary component the same phase change material as that contained in the recording film as a primary component.

5. An optical recording medium in accordance with claim 1, wherein the moisture-proof layer is formed so as to have a thickness of 20 to 300 nm.

6. An optical recording medium in accordance with claim 2, wherein the moisture-proof layer is formed so as to have a thickness of 20 to 300 nm.

7. An optical recording medium in accordance with claim 3, wherein the moisture-proof layer is formed so as to have a thickness of 20 to 300 nm.

8. An optical recording medium in accordance with claim 4, wherein the moisture-proof layer is formed so as to have a thickness of 20 to 300 nm.

* * * * *